(12) United States Patent
Haas et al.

(10) Patent No.: US 11,933,388 B2
(45) Date of Patent: Mar. 19, 2024

(54) POWERSHIFT TRANSMISSION OF A MOTOR VEHICLE

(71) Applicant: ZF Friedrichshafen AG, Friedrichshafen (DE)

(72) Inventors: Michael Haas, Hengersberg (DE); Martin Dankesreiter, Passau (DE); Thomas Oberbuchner, Passau (DE); Thomas Pauli, Passau (DE); Stefan Igl, Vilshofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/050,495

(22) Filed: Oct. 28, 2022

(65) Prior Publication Data

US 2023/0140641 A1 May 4, 2023

(30) Foreign Application Priority Data

Nov. 3, 2021 (DE) ...................... 10 2021 212 363.5

(51) Int. Cl.
*F16H 3/00* (2006.01)
*F16H 3/085* (2006.01)
(Continued)

(52) U.S. Cl.
CPC .............. *F16H 3/006* (2013.01); *F16H 3/085* (2013.01); *F16H 3/093* (2013.01);
(Continued)

(58) Field of Classification Search
CPC .......... F16H 3/006; F16H 3/085; F16H 3/093; F16H 37/042; F16H 63/3062; F16H 37/043; F16H 2003/0818
See application file for complete search history.

(56) References Cited

U.S. PATENT DOCUMENTS

| 4,244,232 A | 1/1981 | Murayama |
| 4,461,188 A | 7/1984 | Fisher |
(Continued)

FOREIGN PATENT DOCUMENTS

| DE | 26 45 907 A1 | 4/1978 |
| DE | 693 08 576 A1 | 9/1997 |
(Continued)

*Primary Examiner* — William C Joyce
(74) *Attorney, Agent, or Firm* — Finch & Maloney PLLC

(57) ABSTRACT

A powershift transmission has a split group with a plurality of powershift stages and an input shaft that can be rotatably driven by a drive shaft of a motorized drive. The input shaft transmits in a stepped-up manner to an output shaft of the split group a rotational movement corresponding to a selected powershiftable stage transmission. A synchromesh transmission group has at least four gear stages and can be rotatably driven by the output shaft of the split group via an intermediate group located therebetween, and via the output shaft of the synchromesh transmission group an axle transmission of the motor vehicle can be rotatably driven. The intermediate group has first and second switching elements each having an output shaft that can be coupled by means of a switchable clutch to an idler. First and second output gears are arranged on the output shaft of the synchromesh transmission group.

6 Claims, 1 Drawing Sheet

(51) Int. Cl.
*F16H 3/093* (2006.01)
*F16H 63/30* (2006.01)
*F16H 3/08* (2006.01)

(52) U.S. Cl.
CPC ..... *F16H 63/3026* (2013.01); *F16H 63/3043* (2013.01); *F16H 2003/0818* (2013.01)

(56) References Cited

U.S. PATENT DOCUMENTS

| | | | |
|---|---|---|---|
| 5,592,854 | A | 1/1997 | Alfredsson |
| 6,742,829 | B2 | 6/2004 | Reihl |
| 6,958,028 | B2 | 10/2005 | Janson et al. |
| 7,155,994 | B2 | 1/2007 | Gumpoltsberger |
| 7,470,206 | B2 | 12/2008 | Rodgers, II |
| 7,878,083 | B2 | 2/2011 | Nicklass et al. |
| 7,914,412 | B2 | 3/2011 | Gitt |
| 8,051,732 | B2 | 11/2011 | Gitt |
| 8,142,322 | B2 | 5/2012 | Raszkowski |
| 8,166,842 | B2 | 5/2012 | Rieger |
| 8,485,056 | B2 | 7/2013 | Ross |
| 8,635,925 | B2 | 1/2014 | Gerlofs et al. |
| 9,145,959 | B2 | 9/2015 | Otten |
| 9,945,461 | B2 | 4/2018 | Reisch et al. |
| 10,968,984 | B2 | 4/2021 | Pauli et al. |
| 2004/0144190 | A1 | 7/2004 | Hall, III |
| 2007/0277633 | A1 | 12/2007 | Burgardt et al. |
| 2009/0017957 | A1 | 1/2009 | Triller et al. |
| 2009/0173175 | A1 | 7/2009 | Thery |
| 2009/0205452 | A1* | 8/2009 | Gitt ........................ F16H 37/043 74/329 |
| 2011/0036186 | A1 | 2/2011 | Gumpoltsberger et al. |
| 2012/0216639 | A1 | 8/2012 | Renner |
| 2014/0196556 | A1* | 7/2014 | Beck ........................ F16H 37/043 74/331 |

FOREIGN PATENT DOCUMENTS

| | | |
|---|---|---|
| DE | 102 31 838 A1 | 2/2004 |
| DE | 10 2007 046 737 A1 | 4/2009 |
| DE | 10 2005 044 068 A1 | 5/2009 |
| DE | 10 2007 000 595 A1 | 5/2009 |
| DE | 10 2009 000 776 A1 | 8/2010 |
| DE | 10 2009 000 778 A1 | 8/2010 |
| DE | 10 2009 000 779 A1 | 8/2010 |
| DE | 10 2010 029 597 A1 | 12/2011 |
| DE | 10 2011 076 390 A1 | 11/2012 |
| DE | 10 2011 077 597 A1 | 12/2012 |
| DE | 10 2011 084 621 A1 | 4/2013 |
| DE | 10 2013 200 646 A1 | 7/2014 |
| DE | 10 2013 110 709 A1 | 4/2015 |
| DE | 10 2015 206 881 A1 | 10/2016 |
| EP | 0 495 942 B1 | 1/1995 |
| EP | 0 797 025 A1 | 9/1997 |
| EP | 1 624 232 A1 | 2/2006 |
| WO | 94/07055 A1 | 3/1994 |

* cited by examiner

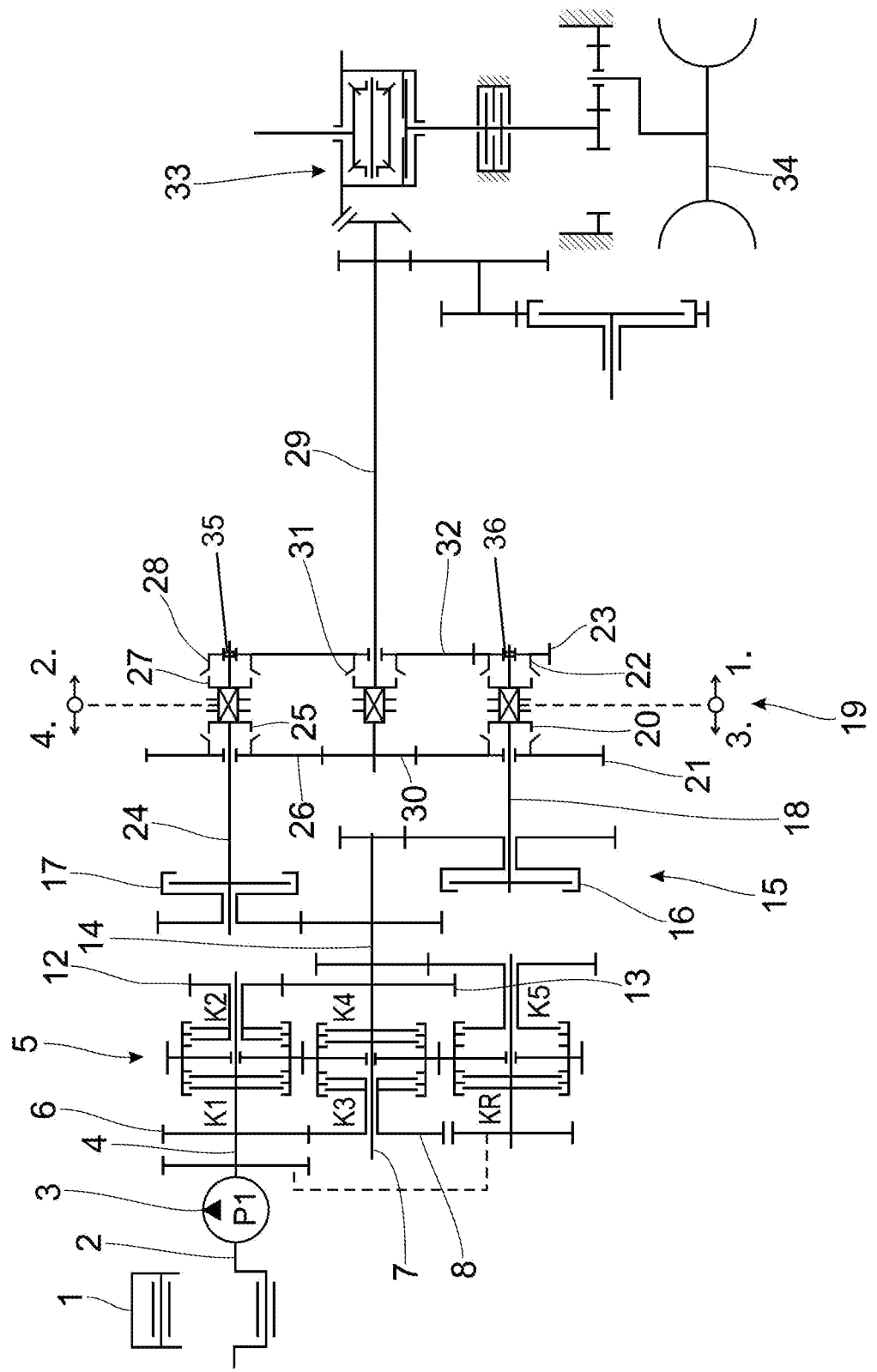

POWERSHIFT TRANSMISSION OF A MOTOR VEHICLE

RELATED APPLICATIONS

This application claims the benefit of and right of priority under 35 U.S.C. § 119 to German Patent Application no. 10 2021 212 363.5, filed on 3 Nov. 2021, the contents of which are incorporated herein by reference in its entirety.

FIELD OF THE DISCLOSURE

The invention relates to a powershift transmission of a motor vehicle having a split group, which has a plurality of powershift stages, and whose input shaft can be rotatably driven by a drive shaft of a motorized drive, and transmits in a stepped-up manner to an output shaft of the split group a rotational movement corresponding to a selection of one of several powershiftable stage transmissions, wherein a synchromesh transmission group which has at least four gear stages can be rotatably driven by the output shaft of the split group via an intermediate group located therebetween and an axle transmission of the motor vehicle can be rotatably driven by the output shaft of the synchromesh transmission group, wherein the intermediate group has a first and a second switching element each having an output shaft, wherein the output shaft of the first switching element can be coupled in each case by means of a switchable coupling to a first idler, which has a higher number of teeth, of a high gear or a second idler, which has a lower number of teeth, of a low gear, and wherein the output shaft of the second switching element can be coupled in each case by means of a switchable coupling to a third idler, which has a higher number of teeth, of a high gear or to a fourth idler, which has a lower number of teeth, of a low gear, having a first output gear which is securely arranged on the output shaft of the synchromesh transmission group and in which the first idler and the third idler engage and having a second output gear which is arranged on the output shaft of the synchromesh transmission group and in which the second idler and the fourth idler engage.

BACKGROUND

In such a powershift transmission, it is known that the second idler and the fourth idler engage in the output gear, which is securely arranged on the output shaft of the synchromesh transmission group. If one of the switchable couplings of the first idler or the third idler is closed, the second idler and the fourth idler are also rotatably driven by means of the first output gear and the output shaft of the synchromesh transmission group and the second output gear. This leads in these second and fourth idlers to high speeds at the output shafts of the switching elements, on which they are supported, so as to be able to be freely rotated as a result of the open switchable couplings associated therewith.

This may lead to a rapid defect of the bearings of the second idler and the fourth idler on the output shafts of the intermediate transmission which are associated therewith in each case, and consequently to a failure of the powershift transmission.

SUMMARY

An object of the invention is therefore to provide a powershift transmission of a motor vehicle of the type mentioned in the introduction, which avoids this disadvantage and which with a simple structure has a high degree of resistance to defects.

This object is achieved according to the invention in that, when the second idler or the fourth idler is coupled, by means of a switching apparatus, the second output gear can be connected in a rotationally secure manner to the output shaft of the synchromesh transmission group and, when the first idler or third idler is coupled, the second output gear is decoupled by the switching apparatus from the output shaft of the synchromesh transmission group.

As a result of this solution, a free rotation of the second idler and the fourth idler on the output shafts of the intermediate transmission associated therewith, and consequently a failure of the powershift transmission, are prevented.

As a result of the powershift intermediate transmission, in a transmission of the type mentioned in the introduction, the number of powershiftable gears in the overall transmission in which all the gears can be switched without any interruption of tensile force is multiplied in a simple manner.

An internal combustion engine, such as a diesel engine, is suitable as a motorized drive. However, any other suitable motorized drive can also be used.

In this instance, the split group may have one or more powershiftable forward stage transmissions whose number is multiplied by the intermediate transmission.

The split group may also have one or more powershiftable reverse stage transmissions whose number is multiplied by the intermediate transmission.

The clutches and/or the switching apparatus may be able to be switched magnetically and/or switched electrohydraulically.

The clutches may be non-positive-locking clutches and/or frictionally engaging clutches.

The repeatedly powershiftable intermediate transmission may have a plurality of clutches which are each associated with a switching position of the repeatedly powershiftable intermediate transmission, wherein the clutches may be able to be switched, for example, in a manner operated in a manual or electrohydraulic manner.

The gear stages of the transmission are in this instance advantageously distributed in the manner of a dual-clutch transmission over the in particular two clutches so that a first clutch switches, for example, all the even gear stages and a second clutch switches, for example, all the odd gear stages.

In order to produce a hydraulic pressure for the electrohydraulic switchability, the input shaft may be able to be driven by means of a hydraulic pump by the drive shaft of the motorized drive so that no separate drive is required for the hydraulic pump.

A space-saving embodiment involves the clutches being dual-synchronous clutches which can be switched from a neutral position into a first clutch switching position and a second clutch switching position.

A long service-life is achieved when the second idler is rotatably supported by means of a roller bearing on the output shaft, which is associated therewith, of the intermediate group and/or the fourth idler is rotatably supported by means of a roller bearing on the output shaft, which is associated therewith, of the intermediate group. In an alternative preferred manner, the second idler may also be rotatably supported by means of a plain bearing on the output shaft, which is associated therewith, of the intermediate group. Similarly, the fourth idler may also be rotatably supported by means of a plain bearing on the output shaft, which is associated therewith, of the intermediate group.

In this instance, in order to reduce the required structural space, the roller bearing of the second idler and/or the roller bearing of the fourth idler may be a needle bearing.

The use of needle bearings is possible as a result of the decoupling according to the invention of the second output gear from the output shaft of the synchromesh subassembly since no overload of the needle bearings thus occurs.

BRIEF DESCRIPTION OF THE DRAWING

One embodiment of the invention is illustrated in the drawings and is described in greater detail below. The single FIGURE of the drawing shows a schematic illustration of a powershift transmission for motor vehicles.

DETAILED DESCRIPTION

The illustrated powershift transmission has an internal combustion engine as a motorized drive 1, by the drive shaft 2 of which an input shaft 4 of a split group 5 having a plurality of powershiftable stage transmissions is rotatably driven by means of a hydraulic pump 3.

The input shaft 4 carries a first fixed gear 6 which meshes with an idler 8, which is rotatably supported on an output shaft 7 of the split group 5, of the split group 5.

On the input shaft 4, there is further arranged another idler 12 of the split group 5, which idler meshes with another fixed gear 13 of the split group 5, which gear is arranged in a rotationally secure manner on the output shaft 7 of the split group 5.

The intermediate group 15 which has two switching elements 16 and 17 is rotatably driven via the output shaft 7 of the split group 5, which forms an input shaft 14 of an intermediate group 15.

The output shaft 18 of the first switching element 16 of the intermediate group 15 can be coupled by means of a first switchable clutch 20 to a first idler 21 which is arranged thereon with a higher number of teeth of a high gear of the synchromesh transmission group 19 or can be coupled by means of a second switchable clutch 22 to a second idler 23 which is arranged thereon with a lower number of teeth of a low gear of the synchromesh transmission group 19.

The output shaft 24 of the second switching element 17 of the intermediate group 15 can be coupled by means of a third switchable clutch 25 to a third idler 26 which is arranged thereon with a higher number of teeth of a high gear of the synchromesh transmission group 19, or the output shaft 24 can be coupled by means of a fourth switchable clutch 27 to a fourth idler 28 which is arranged thereon with a lower number of teeth of a low gear of the synchromesh transmission group 19.

On an output shaft 29 of the synchromesh transmission group 19, there is fixedly arranged a first output gear 30 of the synchronous transmission group 19, in which output gear 30, the first idler 21, and the third idler 26 engage.

Via a switchable switching apparatus 31, a second output gear 32 of the synchronous transmission group 19 can be coupled to the output shaft 29 of the synchronous transmission group 19, in which output gear 32, the second idler 23, and the fourth idler 28 engage. In this case, the second output gear 32 has a substantially higher number of teeth than the first output gear 30.

An axle 34 of the motor vehicle can be rotatably driven by the output shaft 29 of the synchromesh transmission group 19 via an axle transmission 33.

Depending on the selection of the intermediate group 15 and the synchromesh transmission group 19, as a result of a selected switching element 16, 17 of the intermediate group 15 in each case, a considerable increase of the forward gears and the reverse gears of the split group 5 can be achieved.

It is thus possible, for example, with another powershift transmission which is not illustrated and which has a split group of six forward gears, three reverse gears, a two-stage intermediate group, and a three-stage synchromesh transmission to achieve a number of thirty six forward gears and eighteen reverse gears in a simple manner.

When switching the first switchable clutch 20 or when switching the third switchable clutch 25, via the first output gear 30, the output shaft 29 of the synchromesh transmission group 19 is driven at a high speed via the first idler 21 or the third idler 26.

If this is the case, the second output gear 32 is decoupled by the switching apparatus 31 from the output shaft 29 of the synchromesh transmission group 19. Consequently, the high speed of the output shaft 29 of the synchromesh transmission group 19, via the second output gear 32, cannot rotatably drive the second idler 23 and the fourth idler 28 at a high speed and cannot overload the bearings 36 and 35 on the output shafts 18 and 24, respectively.

LIST OF REFERENCE NUMERALS

1 Motorized drive
2 Drive shaft
3 Hydraulic pump
4 Input shaft of split group
5 Split group
6 First fixed gear
7 Output shaft of split group
8 Idler of split group
12 Idler of split group
13 Fixed gear of split group
14 Input shaft of intermediate group
15 Intermediate group
16 First switching element
17 Second switching element
18 Output shaft of first switching element
19 Synchromesh transmission group
20 First switching clutch
21 First idler of synchromesh transmission group
22 Second switching clutch
23 Second idler of synchromesh transmission group
24 Output shaft of second switching element
25 Third switching clutch
26 Third idler of synchromesh transmission group
27 Fourth switching clutch
28 Fourth idler of synchromesh transmission group
29 Output shaft of synchromesh transmission group
30 First output gear of synchromesh transmission group
31 Switching apparatus
32 Second output gear of synchromesh transmission group
33 Axle transmission
34 Axle

The invention claimed is:

1. A powershift transmission of a motor vehicle, comprising:
a split group having a plurality of powershift stage, an input shaft, and an output shaft, the input shaft configured to be rotatably driven by a drive shaft of a motorized drive and configured to transmit in a stepped-up manner to the output shaft of the split group a rotational movement corresponding to a selection of one of a plurality of powershiftable stage transmissions; and a synchromesh transmission group having at least four gear stages configured to be rotatably driven by the output shaft of the split group via an intermediate group located therebetween and via an output shaft of the synchromesh transmission group and via the output shaft of the synchromesh transmission group an axle transmission of the motor vehicle can be rotatably driven wherein the intermediate group has a first switching element and a second switching element each having an output shaft, wherein the output shaft of the first switching element configured to be coupled by means of switchable clutches to a first idler or to a second idler, the first idler having a higher number of teeth of a high gear and the second idler having a lower number of teeth of a low gear, wherein the output shaft of the second switching element is configured to be coupled by means of switchable clutches to a third idler or to a fourth idler, the third idler having a higher number of teeth of a high gear and the fourth idler having a lower number of teeth of a low gear, a first output gear securely arranged on the output, shaft of the synchromesh transmission group and in which the first idler and the third idler engage, a second output gear arranged on the output shaft of the synchromesh transmission group and in which the second idler and the fourth idler engage, and wherein, when the second idler or the fourth idler is coupled by means of the switchable clutches, the second output gear is connectable in a rotationally secure manner to the output shaft of the synchromesh transmission group, and when the first idler or the third idler is coupled, the second output gear is decoupled by a switching apparatus from the output shaft of the synchromesh transmission group.

2. The powershift transmission of claim 1, wherein the switchable clutches and/or the switching apparatus are at least one of switched magnetically and switched electrohydraulically.

3. The powershift transmission as claimed in claim 2, wherein the switchable clutches are at least one of non-positive-locking clutches and frictionally engaging clutches.

4. The powershift transmission of claim 1, wherein the switchable clutches are dual-synchronous clutches which can be switched from a neutral position into a first clutch switching position and a second clutch switching position.

5. The powershift transmission of claim 1, wherein the second idler is rotatably supported by means of a roller bearing or a plain bearing on the output shaft associated therewith of the intermediate group, and/or the fourth idler is rotatably supported by means of a roller bearing or plain bearing on the output shaft, which is associated therewith, of the intermediate group.

6. The powershift transmission as claimed in claim 5, wherein the roller bearing of the second idler and/or the roller bearing of the fourth idler is/are a needle bearing.

* * * * *